April 12, 1966     F. G. BELLEK     3,246,103

ELECTRICAL FUSE OUTLET COVER

Filed Nov. 15, 1961     3 Sheets-Sheet 1

INVENTOR:
FRANK G. BELLEK
BY
ATT'Y

April 12, 1966  F. G. BELLEK  3,246,103
ELECTRICAL FUSE OUTLET COVER
Filed Nov. 15, 1961  3 Sheets-Sheet 2

INVENTOR:
FRANK G. BELLEK
BY
*Jortin D. Harbaugh*
ATT'Y

April 12, 1966     F. G. BELLEK     3,246,103
ELECTRICAL FUSE OUTLET COVER
Filed Nov. 15, 1961     3 Sheets-Sheet 3

INVENTOR:
FRANK G. BELLEK
BY
Watson D. Harbaugh
ATT'Y

3,246,103
ELECTRICAL FUSE OUTLET COVER
Frank G. Bellek, Chicago, Ill., assignor to Bell Electric Company, Chicago, Ill., a corporation of Illinois
Filed Nov. 15, 1961, Ser. No. 152,430
8 Claims. (Cl. 200—121)

This invention relates in general to an electrical wall outlet cover and in particular to a fuse arrangement in connection therewith.

It is frequently necessary and often desirable to provide protection for small electric motors and driven appliances and equipment found throughout the modern home, factories and offices of today. Normally, small motor driven appliances are connected to a common 115 volt power line having a safety fuse of 15 to 30 amperes connected therein to eliminate the possibility of any fire or explosion in the event of an overload occurring on that particular voltage line.

Main and auxiliary fuses are conventionally mounted in a single receptacle or fuse box in the basement or some remote location so that if a short circuit occurs in any point of the system, it is necessary to locate the fuse box and laboriously locate the blown fuse in order to re-energize the circuit.

The utilization of a fuse element in each of the 110 volt lines provide the desired overall protection, but is of little value in protecting the small appliance motors, such as found in clocks, fans, etc., which require a very low amperage draw. When a malfunction occurs in a clock, by way of example, having a two ampere draw and being connected in a voltage line having a 25 or 30 ampere fuse wired therein, it is readily apparent that considerable damage to the clock could result by the time the current draw reaches a value sufficient to rupture the fuse element.

Since there is a considerable variance in the amount of current required for the various motor units and appliances, the single fuse of 15 to 30 amperes for each line has heretofore been considered to provide the best protection for all of the devices.

It is therefore the primary object of this invention to provide an improved electrical wall outlet cover wherein a fuse element is mounted in combination with other electrical elements such as receptacles, switches and indicating lights to permit the unit connected thereto to be protected by a safety fuse of proper amperage.

A specific object of this invention is to provide an improved electrical wall outlet cover having a fuse element mounted therein covered by a protective cap having a portion of the upper wall transparent to permit observation of the fuse at all times during operation of an electrical unit connected thereto.

Another object of this invention is to combine an electrical fuse holder with a plug-in receptacle, switch element or indicating light whereby an electrical fuse mounted therein will handle only the current of the unit controlled by the switch or receptacle.

A further object of my invention is to provide a simple but rugged protective cap having a transparent upper surface to cover the fuse element so that in the event of a short circuit or an overload, a defective fuse cannot explode into the room or otherwise cause a fire hazard. The transparent portion permitting observation of the fuse at all times.

A still further object of this invention is to provide a protective cap to overlie a fuse element wherein the cap is biased to an open position to facilitate removal and installation of the fuse and is resiliently retained in the closed position to prevent injury to those in the area of the fuse in case of a defective fuse exploding.

Other objects and advantages of the electrical wall outlet cover and fuse arrangement of this invention will appear from the following specification and drawings in which.

Figure 1:
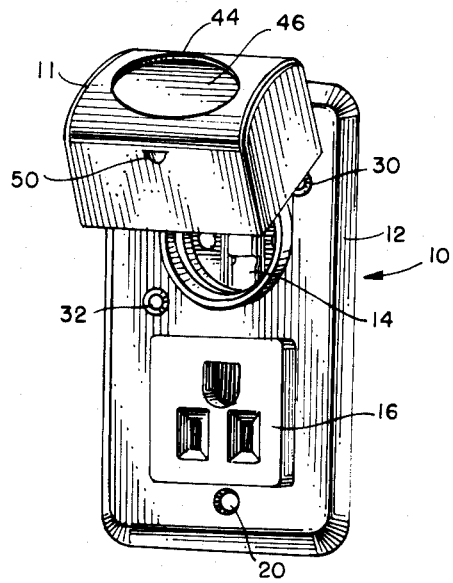
FIG. 1 is a perspective view in front elevation illustrating the electrical wall outlet cover with a fuse protective cap partially in an open position as mounted in conjunction with an electrical plug in receptacle.

By way of generalization for a better understanding of the detailed description of the various embodiments of this invention, the electrical fuse wall outlet cover of this invention is primarily characterized by the provision of a pivotal cap having a transparent member disposed in the top wall to permit viewing of the fuse at all times. Another salient feature characterizing this invention is the interconnection of the fuse with other electrical components, such as control switches, receptacles and indicating lights, all mounted on a single plate to provide safe operation and control of each electrically operated unit connected thereto.

Referring now to the drawings and more specifically to FIGS. 1, 2, 3 and 4, the electrical fuse wall outlet cover of this invention, indicated generally by the numeral 10, provides a cap 11 which is pivotally mounted on a base plate 12 having openings therethrough for the receipt of a fuse holder 14 and an electrical receptacle 16.

Figure 4:
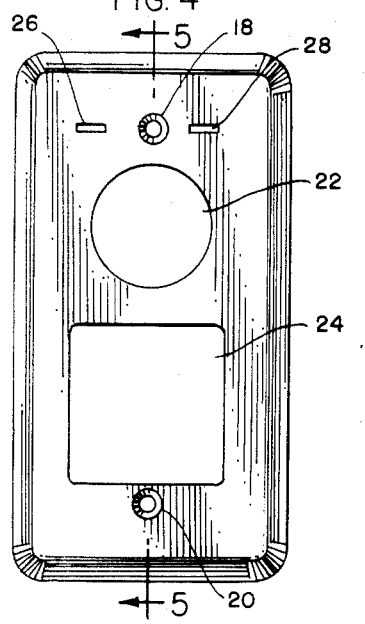
FIG. 4 is a top plan view of the cover with the fuse holder cap and electrical receptacle removed.
Figure 5:
FIG. 5 is a sectional view taken along the lines 5—5 of FIG. 4.

The base plate 12, as best seen in FIGS. 4 and 5, is of conventional configuration with spaced apart openings 18 and 20 provided for securing the plate, by means of screw members (not shown), to an electrical box.

Openings 22 and 24 are formed, at predetermined intervals, through the central portion of the plate 12 to receive a fuse holder 14 and an electrical receptacle 16. As seen by the mounting of a switch member in FIG. 8, or the indicating light in FIG. 9, the opening 24 will have a configuration suitable for the type of electrical component to be mounted.

A pair of spaced apart slots, 26 and 28, are formed through the plate 12 adjacent one end thereof for receipt of flange members integral with the cap 11 to secure the cap in pivotal relationship to the plate 12 as will be described in detail. As readily seen in FIG. 4, the slots 26 and 28 are equally spaced on both sides of the opening 18 and are positioned slightly forward of the center of the opening 18 towards the opening 22 to permit access, when the cap 11 is mounted, to a hold down screw (not shown) which passes through the opening 18 to secure the plate 12 to a conventional electrical box.

The fuse holder 14 is of conventional configuration for use with U.L. Approved Type S Fuses and is secured to the plate 12 by a pair of rivets 30 and 32 which pass therethrough and interconnect with extending ears 34 and 36 on the fuse holder. The fuse holder is designed to provide an upper portion 38 which protrudes through the opening 22 and past the upper surface of the plate 12.

In a similar manner, the electrical receptacle 16 may be of any conventional manufacture and provides an upper lip portion 40 which seats against the upper surface of the plate 12. The receptacle is conventionally held in position by a plurality of spring fingers 42 which maintains the lip portion 40 into constant contact with the plate 12 by applying a resilient pressure to the under surface of the plate 12. As previously mentioned and shown in FIGS. 8 and 9, various electrical elements may be disposed in the plate 12 in conjunction with the fuse holder 14.

Figure 6:
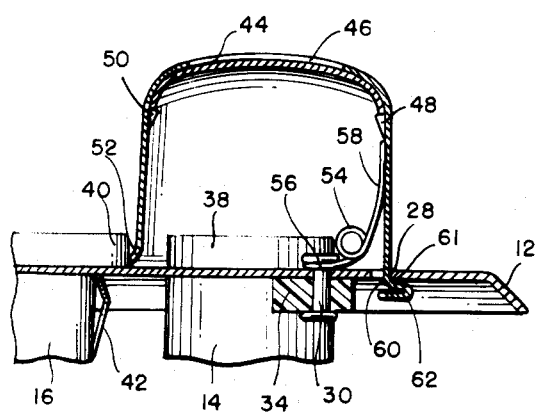
FIG. 6 is an enlarged fragmentary partially sectioned view in side elevation illustrating the relationship of the fuse holder cap and the electrical receptacle and cover when the cap is in the closed position.
Figure 7:
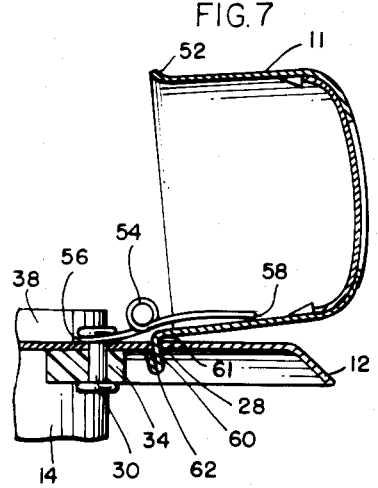
FIG. 7 is an enlarged fragmentary partially sectioned view in side elevation illustrating the relationship of the fuse holder cap when in the open position relative to the cover plate.
Figure 2:
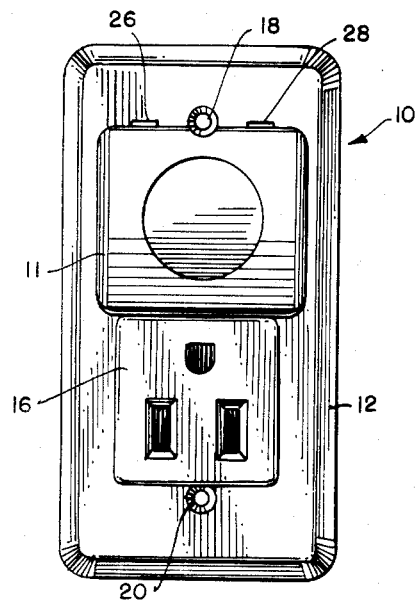
FIG. 2 is a top plan view of the electrical wall outlet cover with the cap portion in the closed position.
Figure 3:
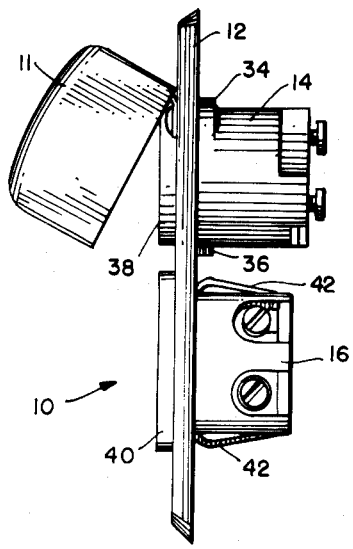
FIG. 3 is a view in side elevation of the electrical wall outlet cover illustrated in FIG. 1.

Referring now to FIGS. 1, 6 and 7, the cap 11 is formed from a suitable rigid material, preferably a light weight metal similar to that utilized to form the base plate 12. The cap 11 is substantially square in configuration with the corners being rounded to give a smooth over all outer appearance. An opening 44 is centrally formed in the upper surface of the cap to permit direct viewing of the fuse member when the cover is in the closed position as seen in FIG. 6.

To provide maximum safety to personnel in the area from the possibility of the fragments from an exploding fuse, fire or shock, the opening 44 is suitably covered by a sheet of transparent heat resistant shatter proof material 46, such as Plexiglas, which is retained in position by flexing the sheet to conform to the upper wall curvature with the peripheral opposing edges seating on abutments 48 and 50 formed in the opposing side walls of the cap.

It is to be understood that the cap 11 may be of any suitable design with the opening 44, being either round, square or of any suitable configuration. Further, it is readily understood that the entire cap may be formed entirely from any transparent material which provides the described protection from the hazards of a defective fuse exploding.

A thin outwardly extending edge portion 52 is formed about the lower periphery of the cap with the edge portion across the front wall frictionally engaging and locking against the lip portion 40 of the receptacle 16 as illustrated in FIG. 6. The edge portion 52 also provides additional support to increase the over all rigidity of the cap.

A spring member 54, having one end 56 secured against the plate 12 by the rivet 30 and the other end 58 being disposed and bearing against the inside surface of the rearward wall of the cap, continually urges the cap to the open position, shown in FIG. 7 facilitate the installation and removal of a fuse from the holder 14. In addition, the force of spring member 54 insures the engagement of the cap with a mating securing member on the plate as shown in FIG. 6 to hold the cap in the closed position.

The cap 11 is maintained in pivotal securement to the plate 12 by flange members 60 extending downwardly and through the slots 26 and 28 in the plate. Flange members 60 are an integral extension of the rear wall of the cap and upon passing through the plate 12 are angularly contoured, as at 61, with the extreme end thereof doubled back against the flange as indicated by the numeral 62. When the cap is in the open position of FIG. 7, the upwardly bent extreme end portion of the flange 60 bears against the under surface of the plate 12 adjacent the slots 26 and 28. Similarly, when the cap is in the closed position of FIG. 6, the rearward surface of the flange 60, just at the point of contour 61, will bear against the edge of the slots 26 and 28. The dimensional relationship between the slots 26 and 28 relative to the closest side of the receptacle 16 is such that the front and rearward walls of the cap 11 will be minutely flexed inwardly to permit the edge portion 52 on the cover to pass frictionally downward against the side of the lip portion 40 of the receptacle. Thus, the combined resiliency of the two walls of the cap plus the action of the spring 54 maintains the cap in secured frictional contact with the lip portion 40 in the closed position.

The pivotal securement of the cap to the base plate and the locking engagement to maintain the cap in the closed position, has been described in detail by way of example only as being the more economical way for manufacturing the entire unit. It is to be understood that any suitable conventional pivotal securing means and locking means may be used.

Figure 8:
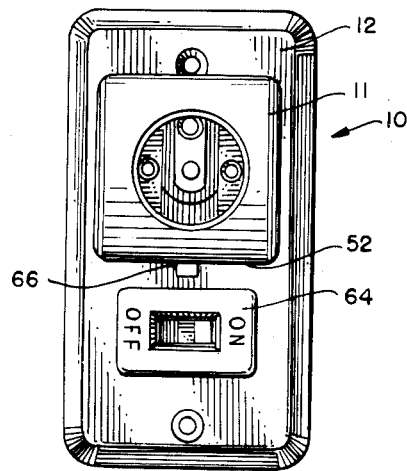
FIG. 8 is a top plan view illustrating an alternate combination of the fuse holder with a switch element mounted on the cover.

Referring now to FIG. 8, a similar arrangement for the electrical fuse outlet cover of this invention is illustrated in conjunction with a switch member 64. The face plate 12 is identical in configuration as previously described with the cap 11 being resiliently and pivotally secured to the plate 12 in the exact same manner. In order to maintain the cap 11 in the closed position, the forward edge portion 52 of the cap frictionally and resiliently engages an abutment 66 formed in the surface of the plate 12, in the same manner as the edge portion 52 engaged the lip 40 of the embodiment previously described.

Figure 9:
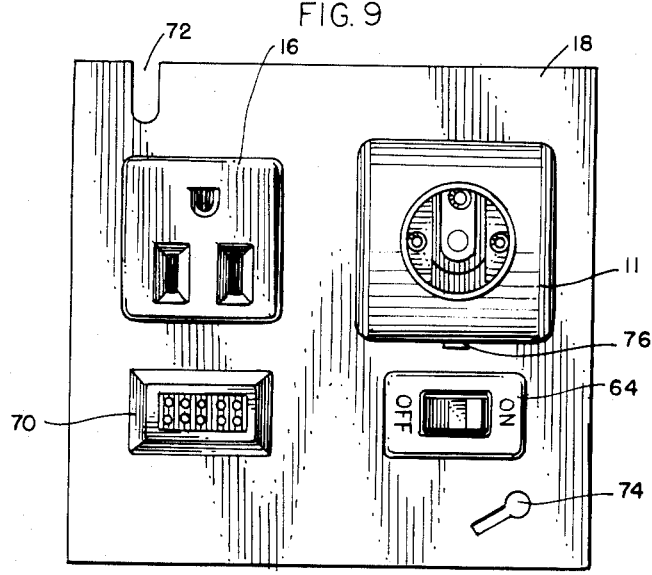
FIG. 9 is a top plan view of an alternate embodiment illustrating a quick release electrical receptacle cover having a fuse holder mounted in relationship with an electrical receptacle, switching element and indicating light.

Referring now to FIG. 9, another arrangement for the electrical fuse outlet cover of this invention is illustrated in relationship to a quick release, detachable junction box cover plate 68 having mounted thereon an electrical receptacle 16, a switch element member 64 and an indicating light 70. The plate 68 provides the normal slots 72 and 74 for ease of engagement or mounting on a junction box. As previously described for the embodiment illustrated in FIG. 8, the cap 11 is maintained in the closed position by frictionally and resiliently engaging an abutment 76 formed in the surface of the plate 68, in similar manner as the abutment 66 previously described. The utilization of the invention as shown in FIG. 9 is obvious in that the three other electrical elements, the receptacle 16, the indicator light 70 and the control switch 64 may all be interconnected with the fuse holder whereby the unit that is plugged into the receptacle 16, is controlled by the switch 64, operation is readily observed by the light 70 or by observation of the fuse beneath the cap.

It is readily understood from the above description that various combinations of the different electrical elements may be mounted in conjunction with the fuse holder. That a fuse of proper amperage is provided for the individual electrical device rather than relying upon the normally larger amperage fuses disposed in the power line. Further, the use of the Plexiglas over the opening in the cap 11 permits ready observation yet fully protects the observer from any possibility of injury from fragmentary particles or fire which may be emitted due to an explosion or rupture of the fuse body.

It is also apparent that the arrangement of an indicating light with the fuse and the control switch permits remote operation and the indicating light will quickly indicate that the circuit is alive and that a motor or unit is operating or else indicating that the switch is off or the fuse has been blown due to a overdraw of current probably from a malfunction in the motor or unit.

Thus, it is readily understood that by the installation of the fuse and the protective cover in combination with the other electrical components readily reduces the danger, cost and inconvenience of motor burn outs due to the multitude of malfunctions such as bearings, lack of oil, tight belts, overloading and wrong or low voltages.

The relationship of the fuse holder with the other electrical elements on the cover, readily permits it to be mounted anywhere in the existing circuits to handle only the current that passes through the electrical device. The cover of this invention provides the ideal electrical p protection for many household, commercial and industrial uses such as oil burners, freezers, air conditioners, attic fans, sump pumps, drill presses, power saws and similar equipment.

Although several embodiments of this invention have been shown and described, it will be understood by those skilled in the art that details of construction and arrangement may be altered or omitted without departing from the spirit of this invention as defined by the following claims.

What is claimed is:

1. The combination of
a base plate for an electrical wall outlet, said base plate having a safety fuse holder mounted therein for threadably receiving a safety fuse,
a transparent cap pivotally mounted for movement between two alternate positions of covering and exposing the fuse holder comprising a transparent upper wall portion and side walls depending downwardly therefrom and including a side wall having a flared edge remote from said pivotal mounting,
said pivotal mounting including a slot in said base plate and a flange upon another side wall received in said slot,
bias means disposed between said base plate and said cap adjacent to the pivotal mounting to urge continuously said cap to one of said positions in a direction holding said flange in said slot, and
means resiliently engaging said flared edge to hold said cap in the other of said positions and said flange in said slot, said cap permitting observation of the fuse holder through the cap in said fuse holder covering portion.

2. The combination of
a cover for an electrical wall outlet, said cover having a base plate disposed over the outlet,
a fuse holder mounted in said base plate for threadably receiving a safety fuse and having a slot spaced therefrom,
a protective cap disposed over the fuse holder comprising an upper wall having an opening formed therethrough; a front wall, a rear wall, and parallel side walls depending from said upper wall in contiguous relationship,
a transparent member received from within and disposed against said upper wall covering the opening therethrough;
a flange member extending downwardly from said rear wall and through the slot in the base plate to pivotally retain the cap to the base plate and having an end extending below the base plate enlarged to prevent its removal from the slot;
bias means disposed between the base plate and said cap urging the cap to an open position, and
an abutment formed in said base plate in juxtaposition with the front wall of the cap when the cap is in the closed position,
said front wall and rear wall flexing inwardly and permitting the front wall to engage the abutment in secured relationship to permit the cap to encompass the fuse holder and eliminate the hazard of a defective fuse in said fuse holder from blowing into the area, the fuse holder being observable through the transparent member.

3. The combination of
a cover for an electrical wall outlet, said cover having a base plate disposed over the outlet,
an electrical prong receptacle and
a fuse holder mounted on said base plate,
a protective cap disposed over the fuse holder comprising an upper wall having an opening formed therethrough; a front wall, a rear wall, and parallel side walls depending from said upper wall in contiguous relationship;
means pivotally engaging the rear wall and the base plate for pivotal movement of the cap,
a transparent member secured from within the cap and against said upper wall covering the opening therethrough, and
bias means disposed between the base plate and said cap urging the cap to an open position,
the edge of the prong receptacle being in juxtaposition with the front wall of the cap when the cap is in the closed position with said front wall and rear wall flexing inwardly permitting the front wall to engage the edge of the receptacle in secured relationship and permit the cap to encompass the fuse holder with the fuse holder readily viewed at all times through the transparent member.

4. The combination of
a cover for an electrical wall outlet, said cover having a base plate disposed over the outlet,
an electrical prong receptacle mounted on the base plate,
a fuse holder mounted on the base plate next to the receptacle,
a protective cap disposed over the fuse holder comprising an upper wall having an opening formed therethrough; a front wall, a rear wall, and parallel side walls depending from said upper wall in contiguous relationship;
a transparent member disposed against the inside face of said upper wall covering the opening therethrough; means carried by said depending walls marginally engaging said transparent member to hold it against said inside face,
flange members extending downwardly from said rear wall through the base plate to pivotally retain the cap to the base plate, means on said flange members obstructing removal of said flange members from said base plate,
bias means disposed between the base plate and said rear wall of said cap urging the cap to an open position,
an edge of the prong receptacle being in juxtaposition with the front wall of the cap when the cap is in the closed position, and
means on said front wall for engaging said receptacle edge, said front wall and rear wall flexing inwardly permitting the front wall means to engage the edge of the prong receptacle in secured relationship to hold the cap over the fuse holder with the fuse holder viewed through the transparent member.

5. The combination of
a removable cover for an electrical junction box, said cover including
a base plate,
a safety fuse holder and a prong receptacle securely mounted on the base plate,
a protective cap positioned over the fuse holder comprising an upper wall having an opening therethrough;
a transparent member secured over the opening against the bottom of said upper wall; a front wall, rear wall and parallel side walls depending from said upper wall; flange members extending from said rear wall through the base plate to pivotally retain the cap to the base plate and being enlarged below the base plate to prevent removal of the flange members;
locking means disposed on said base plate to secure said cap in the closed position, and
bias means disposed between the base plate and the cap to urge the cap to the open position to facilitate access to the fuse holder, said fuse holder being readily observed through the transparent member when the cap is in the closed position.

6. The combination of
a cover for an electrical wall outlet, said cover including
a base plate disposed over the outlet,
an electrical prong receptacle and
a fuse holder mounted therein threadably receiving a safety fuse,
a protective cap disposed over the fuse holder comprising an upper wall having an opening formed therethrough; a front wall, a rear wall, and parallel side walls depending from said upper wall in contiguous relationship;

a transparent member disposed behind and against said upper walll covering the opening therethrough and flange members extending downwardly from said rear wall through the base plate-pivotally retaining the cap on the base plate, an edge of the prong receptacle being disposed in juxtaposition with the front wall of the cap when the cap is in the closed position, said front wall and rear wall flexing inwardly permitting the front wall to engage the prong receptacle in frictionally secured relationship for holding the cap closed to encompass fuse holder where it can be viewed through the transparent member.

7. The combination of a removable cover for an electrical junction box, said cover including a base plate, a fuse holder, a prong receptacle securely mounted on a base plate, said base plate having slots spaced from said receptacle, a protective cap positioned over the fuse holder comprising an upper wall having an opening therethrough;

a transparent member secured over the opening; a front wall, rear wall and parallel side walls depending from said upper wall; flange members extending from said rear wall through said slots in the base plate to pivotally retain the cap to the base plate and having an end extended below the base plate doubled back upon itself to prevent its removal from the slots;

locking means disposed on said base plate to secure said cap in the closed position, said fuse holder being readily observed through the transparent member when the cap is in the closed position.

8. The combination of a cover for an electrical wall outlet, said cover including a base plate disposed over the wall outlet, an electrical prong receptacle, and a fuse holder mounted thereon, on the base plate a protective cap disposed over the fuse holder comprising an upper wall having an opening formed therethrough; a front wall, a rear wall, and parallel side walls depending from said upper wall in contiguous relationship;

a transparent member disposed against said upper wall covering the opening therethrough; flange members extending downwardly from said rear wall through the base plate to pivotally retain the cap to the base plate and a spring member disposed between the base plate and said cap urging the cap to an open position, the edge of the prong receptacle being in juxtaposition with the front wall of the cap when the cap is in the closed position, said front wall and rear wall flexing inwardly permitting the front wall to engage the prong receptacle, the resilient force created by the flexing of said front and rear walls opposing the force of said spring to maintain the cap in the closed position for the cap to encompass the fuse holder with the fuse holder viewed through the transparent member.

References Cited by the Examiner

UNITED STATES PATENTS

| | | | |
|---|---|---|---|
| 1,662,275 | 3/1928 | Lane | 174—66 |
| 2,075,883 | 4/1937 | Britsch | 67—7 |
| 2,324,738 | 7/1943 | Stieglitz | 200—42 |
| 2,465,079 | 3/1949 | Fitzgerald | 200—114 |
| 2,471,848 | 5/1949 | Von Hoorn | 200—167 |
| 2,510,745 | 6/1950 | Kilgore | 174—67 |
| 2,517,191 | 8/1950 | Flickinger et al | 67—7 |
| 2,526,606 | 10/1950 | Gregg | 174—67 |
| 2,562,947 | 8/1951 | Richard et al. | 200—115 |
| 2,667,547 | 1/1954 | Lindeman | 200—115 |
| 2,880,264 | 3/1959 | Ruskin | 339—44 |
| 3,048,672 | 8/1962 | Cataldo et al. | 200—50 |

FOREIGN PATENTS 2,780    2/1899    Great Britain.

ROBERT K. SCHAEFER, *Acting Primary Examiner.*

BERNARD A. GILHEANY, *Examiner.*